(12) United States Patent
Zischka

(10) Patent No.: US 11,780,396 B2
(45) Date of Patent: Oct. 10, 2023

(54) AIRBAG CONTROL DEVICE AND AIRBAG UNIT

(71) Applicants: ZF AUTOMOTIVE GERMANY GMBH, Alfdorf (DE); Audi AG, Ingolstadt (DE)

(72) Inventor: Gerd Zischka, Schwäbisch Gmünd (DE)

(73) Assignees: ZF AUTOMOTIVE GERMANY GMBH, Aldorf (DE); AUDI AG, Ingolstadt (DE)

( * ) Notice: Subject to any disclaimer, the term of this patent is extended or adjusted under 35 U.S.C. 154(b) by 0 days.

(21) Appl. No.: 17/267,047

(22) PCT Filed: Aug. 9, 2019

(86) PCT No.: PCT/EP2019/071403
§ 371 (c)(1),
(2) Date: Feb. 9, 2021

(87) PCT Pub. No.: WO2020/030780
PCT Pub. Date: Feb. 13, 2020

(65) Prior Publication Data
US 2021/0300285 A1    Sep. 30, 2021

(30) Foreign Application Priority Data
Aug. 10, 2018    (DE) .................... 10 2018 119 527.3

(51) Int. Cl.
*B60R 21/207*    (2006.01)
*B60R 21/231*    (2011.01)
(Continued)

(52) U.S. Cl.
CPC .......... *B60R 21/207* (2013.01); *B60R 21/239* (2013.01); *B60R 21/23138* (2013.01);
(Continued)

(58) Field of Classification Search
None
See application file for complete search history.

(56) References Cited

U.S. PATENT DOCUMENTS

| | | | |
|---|---|---|---|
| 6,932,384 B2 * | 8/2005 | Waid ..................... | B60R 21/276 280/739 |
| 2004/0012179 A1 * | 1/2004 | Pinsenschaum ...... | B60R 21/239 280/739 |

(Continued)

FOREIGN PATENT DOCUMENTS

| CN | 113613961 A | * 11/2021 | ....... B60R 21/23138 |
|---|---|---|---|
| DE | 19726878 A1 | * 10/1998 | ......... B60R 21/2155 |

(Continued)

OTHER PUBLICATIONS

International Search Report for corresponding International Application Serial No. PCT/EP2019/071403, dated Oct. 7, 2019, pp. 1-4.

*Primary Examiner* — Faye M Fleming
(74) *Attorney, Agent, or Firm* — TAROLLI, SUNDHEIM, COVELL & TUMMINO L.L.P

(57) ABSTRACT

An airbag control device for controlling the volume of an airbag (10) of a restraining means, comprising an inflator (14) for inflating the airbag (10) and an electrically controllable decoupling device (22) for tension means via which the geometry of the airbag (10) can be varied, is characterized in that the inflator (14) and the decoupling device (22) are fluid-communicated and the decoupling device (22) includes at least one outlet opening (36) the cross-section of which is variable by an electrically controllable actuator (46) and through which gas can escape from the inflator (14) to the atmosphere. Moreover, the invention describes an airbag unit.

15 Claims, 3 Drawing Sheets

(51) Int. Cl.
    *B60R 21/239*     (2006.01)
    *B60R 21/264*     (2006.01)
    *B60R 21/2338*     (2011.01)
    *B60R 21/26*     (2011.01)

(52) U.S. Cl.
    CPC ..... *B60R 21/264* (2013.01); *B60R 2021/2395* (2013.01); *B60R 2021/23146* (2013.01); *B60R 2021/23382* (2013.01); *B60R 2021/26094* (2013.01)

(56) References Cited

U.S. PATENT DOCUMENTS

2006/0290118 A1    12/2006  Thomas
2007/0267855 A1    11/2007  Lewis et al.

FOREIGN PATENT DOCUMENTS

| | | | | |
|---|---|---|---|---|
| DE | 10210328 A1 | 10/2002 | | |
| DE | 102005012614 A1 | 10/2005 | | |
| DE | 60210051 T2 | 11/2006 | | |
| DE | 102005049553 A1 | 4/2007 | | |
| DE | 102007007549 A1 | 10/2007 | | |
| DE | 60035287 T2 | 2/2008 | | |
| DE | 102009005771 A1 | 7/2010 | | |
| DE | 102013013177 A1 * | 2/2015 | ......... | B60R 21/2338 |
| EP | 1834847 A1 | 9/2007 | | |
| EP | 2174845 A1 | 4/2010 | | |
| EP | 3162640 A1 | 5/2017 | | |
| KR | 2006100823 A * | 9/2006 | | |
| WO | 2001/34436 A1 | 5/2001 | | |

* cited by examiner

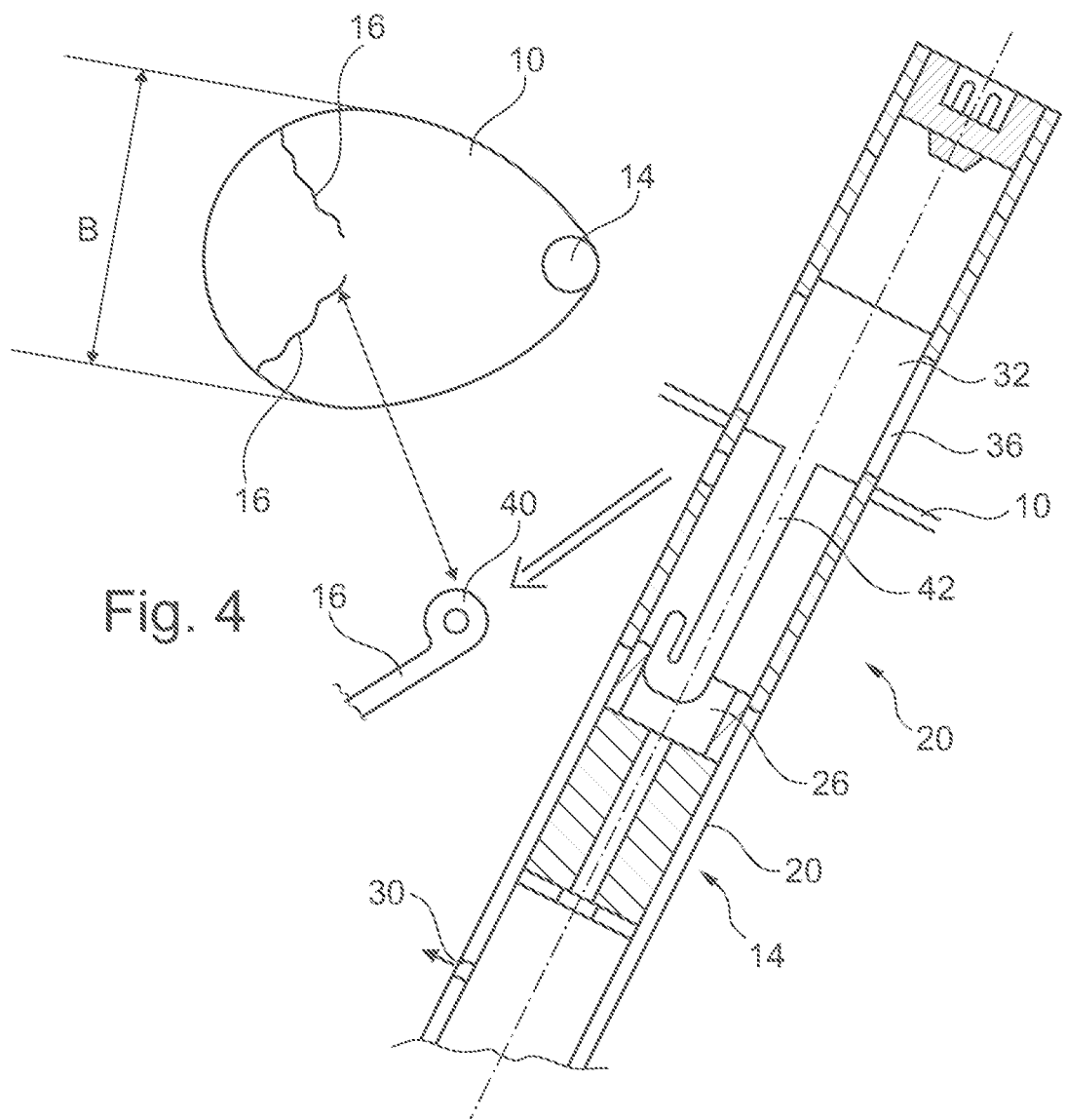

AIRBAG CONTROL DEVICE AND AIRBAG UNIT

RELATED APPLICATIONS

The present invention is a U.S. National Stage under 35 USC 371 patent application, claiming priority to Serial No. PCT/EP2019/071403, filed on 9 Aug. 2019; which claims priority from 10 2018 119 527.3, filed 10 Aug. 2018, the entirety of both of which are incorporated herein by reference.

BACKGROUND OF THE INVENTION

The invention relates to an airbag control device for controlling the volume of an airbag of restraining means, especially a side airbag integrated in a vehicle seat, comprising an inflator for inflating the airbag and an electrically controllable decoupling device for tension means via which the geometry of the airbag can be varied.

The size of the airbag depends on the space in which the airbag can deploy at the vehicle. If a quite large space is provided between the occupant and the door panel, for example, then a side airbag having a quite large volume can be used to reduce the load of the occupants. However, the smaller such space, the smaller also the airbag volume must be so that the positioning of the occupant can be ensured in the case of restraint.

In vehicles of a more recent design, signals and control options may additionally be provided via sensor technologies such as radar, infrared and the like to enable the airbag module to be released even before crash. This means that the space available for the deployment of the airbag is enlarged, because the car body parts which otherwise would reduce the space for the deployment of the airbag are not yet deformed. This relates especially to side airbag modules.

In order to be able to vary the volume of airbags, it is known to make use of tension means in the form of tethers which extend inside the airbag and limit the movement of a panel portion of the airbag.

Moreover, it is known to fill the airbag by a single-stage inflator and to provide so-called outlet openings. Through the outlet openings, gas can flow out into the atmosphere which either has already served to inflate the airbag or which is already flowing into the atmosphere from the inflator without having contributed to the inflation of the airbag.

SUMMARY OF THE INVENTION

It is the object of the present invention to provide an airbag control device which has a very simple and compact design and by which the airbag volume can be controlled.

This object is achieved by an airbag control device for controlling the volume of an airbag, in particular a side airbag integrated in a vehicle seat, of a restraining means, comprising an inflator for inflating the airbag and an electrically controllable decoupling device for a tension means via which the geometry of the airbag can be varied, wherein the inflator and the decoupling device are fluid-communicated and the decoupling device includes at least one outlet opening the cross-section of which is variable through an electrically controllable actuator and through which gas can escape from the inflator to the atmosphere.

The invention connects the inflator to the decoupling device and makes sure that in the decoupling device a type of valve is present to control the outlet opening. On the one hand, the construction space is minimized and, on the other hand, it is possible to utilize parts having a double function.

The inflator in particular is a single-stage inflator so that the same amount of gas is constantly made available.

The decoupling device includes an outer housing that is mechanically coupled to the inflator housing. Alternatively, the outer housing of the decoupling device is formed as one part or integrally with the inflator housing. Although an adapter member may be provided between the outer housing and the inflator housing, in the preferred embodiment of the invention the outer housing is fastened directly on the inflator housing or is formed integrally with the inflator housing.

In particular, the inflator housing is tube-shaped just as the outer housing so that the inflator housing constitutes an extension of the outer housing. The two outer housings are nested, for example, or are fastened to each other on the front end. Furthermore, the inflator housing and the outer housing of the decoupling device may be in the form of a one-piece outer housing.

A configuration in which the airbag control device is designed such that the outer housing of the decoupling device constitutes an extension of the inflator housing is provided especially for airbag units comprising a seat-integrated side airbag. Such embodiment has a structural form which is excellently suited for a seat-integrated side airbag unit, as the construction space is enlarged, as compared to a simple inflator, merely along the longitudinal axis but not in directions transverse to the longitudinal axis. In seat-integrated side airbag units, the airbag unit is usually arranged laterally on the vehicle seat frame in the padding of the side bolster of the seat back, wherein the longitudinal axis of the inflator and thus of the airbag control device is arranged in parallel to the vertical axis of the vehicle seat frame. Due to an airbag control device according to the invention, consequently an airbag unit comprising an airbag control device according to the invention usually requires, as compared to a simple inflator, an enlarged space in the side bolster of the vehicle seat merely along the vertical axis of the vehicle seat frame.

If the decoupling device includes a cylindrical outer housing, the interior of the outer housing may be fluid-coupled to the interior of the inflator via an open front end. Consequently, the flow paths for the gas escaping to the atmosphere are very short.

As an alternative to this, inside the airbag control device the inflator may be separated in terms of flow from the at least one outlet opening. The one or more outlet openings are intended to be disposed so that they permit flow through the airbag control device, namely to enable gas to flow out of the interior of the airbag to the atmosphere, i.e., to outside the airbag. This means that no gas is flowing inside the airbag control device directly to the outlet opening or outlet openings, but the gas of the inflator initially ensures deployment of the airbag and then flows out of the interior of the airbag through the one or more outlet openings. The one or more outlet openings function like an outlet valve that permits, interrupts or reduces the flow of gas out of the interior of the airbag. In such embodiment, the inflator is fluid-communicated with the outlet opening of the decoupling device especially via the interior of the airbag. In such embodiment, in the mounted state the airbag control device is arranged preferably completely in the interior of the airbag.

In particular, the actuator is configured so that it can both decouple the tension means and close the outlet opening. The actuator therefore has a dual function.

The decoupling device includes, for example, a piston which is movable by the actuator and can decouple the tension means and/or close the outlet opening. Especially when the piston can both decouple the tension means and close the outlet opening, by only one movable member the two main functions of the airbag control device according to the invention are materialized in a mechanically simple manner, viz. the opening/closing of the at least one outlet opening and the decoupling of the tether. Preferably, the piston chamber in which the piston is moving at the same time constitutes an overflow chamber for the gas of the inflator that is to be vented to the atmosphere, if the outlet opening or outlet openings is/are not closed by the piston, when the actuator is not activated.

In one embodiment, the inflator can be fluid-communicated with a piston chamber in the decoupling device which piston chamber includes, when the actuator is not activated, the at least one outlet opening which is open, when the actuator is not activated. This variant, too, additionally helps simplify the design according to the invention, for the piston chamber in which the piston is moving at the same time constitutes an overflow chamber for the gas of the inflator that is to be vented to the atmosphere.

Preferably, the decoupling device may project at least partially from the inflator, whereas the inflator itself may optionally protrude into the interior of the airbag.

If the at least one outlet opening is provided in a cylinder wall guiding the piston, the gas can flow directly through the piston chamber to the atmosphere. The piston seals the piston chamber in one direction.

The actuator acts, for example, on a side of the piston opposed to the piston chamber to move the piston into the piston chamber. In so doing, it is no problem that the actuator operates simultaneously with the airbag being inflated so that, on the opposite sides of the piston, on the one hand the actuator is operative and, on the other hand, the inflator is operative. On the one hand, the major quantity of the gas will flow into the airbag and only a part of the gas will flow into the decoupling device, and, on the other hand, the piston chamber is not gastight due to the outlet opening so that the gas leaving the inflator exerts a rather low force upon the piston.

Even in an embodiment in which the inflator is fluid-communicated, especially through the interior of the airbag, with the outlet opening of the decoupling device, the actuator may act, for example, on a side of the piston opposed to the piston chamber so as to move the piston within the piston chamber and thus to close the outlet opening.

In order to maintain the position of the piston after displacing the latter and closing the at least one outlet opening, a mechanical securing device such as a snap-fit connection may be provided between the outer housing and the piston.

Preferably, the outlet opening is disposed so that, by displacing the piston, the at least one outlet opening can be closed. The piston so-to-speak is the closure part of the valve that can close the outlet opening.

A device for retaining and/or releasing the tether or, more generally speaking, the tension means which is activated by displacing the piston may be provided on the piston.

Said device is a hook fastened on the piston, for example, on which the tension means is detachably fastened, especially wherein the tension means protrudes through an opening in the outer housing into the interior of the decoupling device so as to be attached on the hook there. As an alternative to this, the piston or a part provided on the piston can also destroy the tension means or the holding fixture of the tension means, for example by a cutting means such as a type of knife.

In order to achieve quick operation, the actuator is specifically a pyrotechnical actuator.

Further, the invention relates to an airbag unit comprising an airbag, especially a side airbag, that includes a panel to which at least one tension means is fastened, and comprising an airbag control device according to the invention, wherein, in the non-activated state of the airbag, the tension means is fastened on the airbag control device and is released from the airbag control device when the decoupling device is activated.

An airbag unit of this type is especially configured as a side airbag unit which can be attached to and/or arranged on the vehicle seat frame of the vehicle seat. Preferably, in the mounted state the side airbag unit is arranged inside the side bolster, especially inside the padding of the side bolster of the seat back of the vehicle seat.

BRIEF DESCRIPTION OF THE DRAWINGS

Further features and advantages of the invention will be evident from the following description of the following drawings which are referred to, wherein:

FIG. 3 shows a longitudinal section across the airbag control device according to FIG. 2 when tension means are released, FIG. 4 shows a schematic section across the airbag unit according to FIG. 1 when tension means are released.

DESCRIPTION

Figure 1:
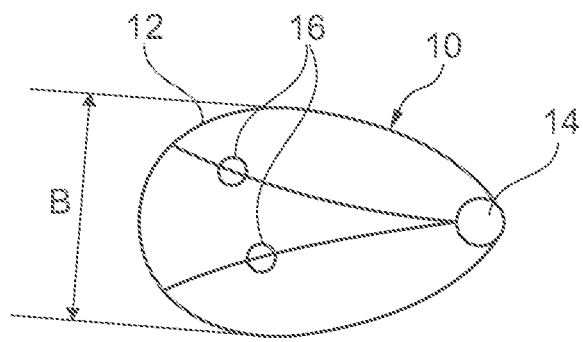
FIG. 1 shows a schematic section across an airbag unit according to the invention.

FIG. 1 illustrates an airbag unit comprising an airbag 10, especially a side airbag, having an outer panel 12.

An inflator 14 serves for deploying the airbag 10. Inside the airbag 10 one or more tethers 16 (tension means) is/are provided which help define the depth of the airbag 10.

Figure 2:
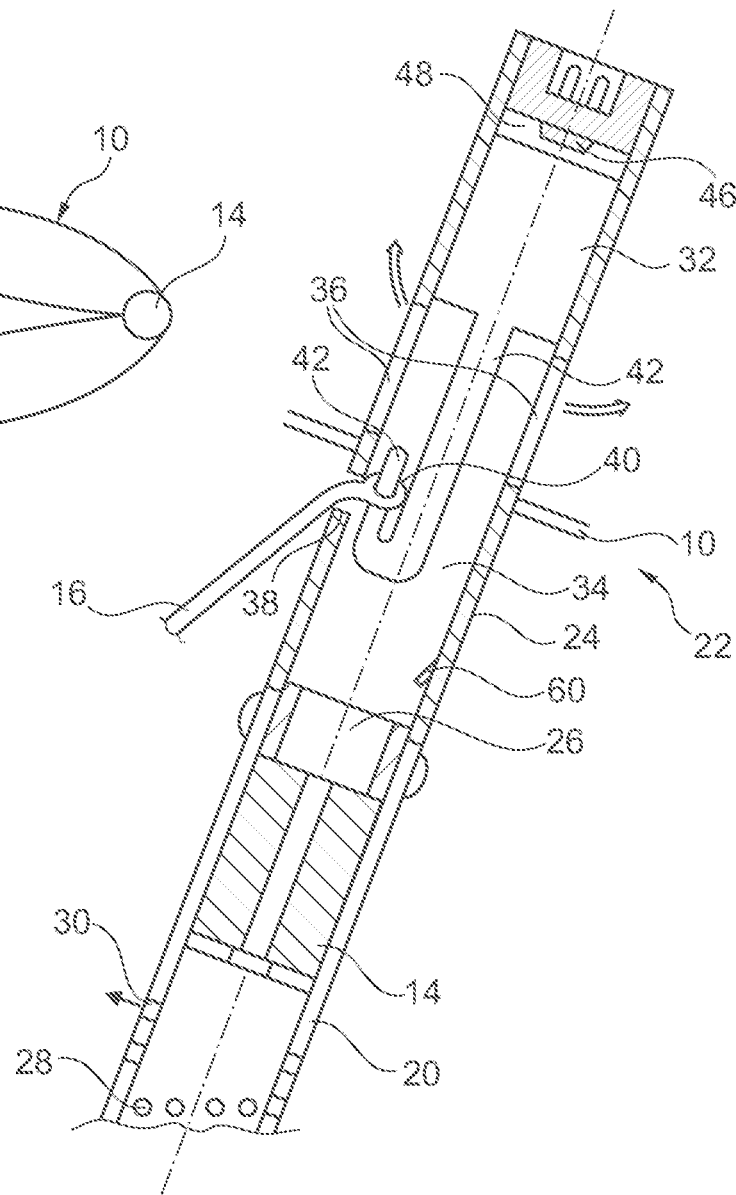
FIG. 2 shows a longitudinal section across a variant of the airbag control device according to the invention that can be used for the airbag unit according to FIG. 1, namely when tension means are not released.

The tethers 16 are fastened, at their rear end, to an airbag control device shown in FIG. 2 that includes an inflator 14 having an inflator housing 20 as well as a decoupling device 22 mechanically directly connected to the inflator 14 and having an outer housing 24 in the form of a cylindrical tube.

The inflator housing 20, too, comprises a cylindrical tube.

The two tubes are nested or otherwise directly connected to each other, for example screwed or caulked to each other or integrally formed.

The front end of the outer housing 24 facing the inflator 14 is open in the embodiment of FIGS. 2 and 3 so that an overflow channel 26 is provided.

Pyrotechnical material 28 inside the inflator 14 can be triggered by an electrical igniter so that gas can flow through openings 30 in the inflator housing 20 to the outside and into the airbag 10 for deployment thereof.

The decoupling device 22 includes an axially movable piston 32 in its interior, wherein a piston chamber 34 is formed between the piston 32 and the inflator 14 in the home position shown in FIG. 2. In the home position shown in FIG. 2, the piston 32 is maximally spaced apart from the inflator 14. In said position, the outer housing 24 includes one or more outlet openings 36 in the area of the piston chamber 34.

Moreover, distanced less than the outlet openings 36 from the inflator, a plug opening 38 through which the end of the tether 16 or a joint end of the plural tethers 16 extends is provided in the outer housing 24. Said end denoted with the reference numeral 40 is a type of eye, for example, which is slipped onto a hook 42 that is permanently fastened with the piston 32 and extends into the piston chamber 34.

On the end of the piston 32 opposed to the inflator 14, an electrically controllable pyrotechnical actuator 46 is provided which, upon activation, causes gas to flow into a working chamber 48.

FIG. 2 symbolically illustrates that the decoupling device 22 electrically controllable by the electrically controllable actuator 46 protrudes from the airbag 10 at least in the area of the outlet openings 36.

As will further be explained in the following, the actuator 46 is adapted, by moving the associated piston 32, to decouple the tether 16 or tethers 16 serving as tension means from the decoupling device 22 as well as to close the outlet openings 36.

Hereinafter, the functioning of the airbag unit and the airbag control device will be illustrated by means of FIGS. 1 to 4. When the inflator 14 is activated electrically via a central control system, preferably even before an impact of the vehicle, gas is generated which flows through the openings 30 into the airbag 10 and deploys the latter. Gas passes through the channel 26 into the piston chamber 34 and via the outlet openings 36 to the atmosphere. The tether or tethers 16 remain active, i.e., they remain fastened on the hook 42 and result in a smaller width B of the airbag 10.

Excess gas flows via the exposed outlet openings 36 to the atmosphere. Nevertheless, the airbag 10 is sufficiently inflated.

If the airbag is intended to have a larger volume and a larger width B (cf. FIG. 4), the actuator 46 is activated simultaneously with or slightly delayed vis-à-vis the inflator 14. Then the piston 32 moves along with the hook 42 in the direction of the inflator 14. The piston 32 closes the outlet openings 36 so that gas is only allowed to flow into the airbag 10 through the openings 30. By shifting the hook 42 while simultaneously retaining the eye due to the plug opening 38, the hook 42 detaches from the end 40 so that the tether or tethers 16 is/are released and is/are detached from the decoupling device 22. Thus, the tethers or the tether 16 is no longer anchored, and the airbag 10 can adopt the configuration having a larger inflation volume shown in FIG. 4.

Even the movement of the piston 32 can take place already before the actual crash.

A securing device 60 in the form of an elastic detent lug on the outer housing 24 maintains the displaced piston 32 in the displaced final position.

Figure 5:
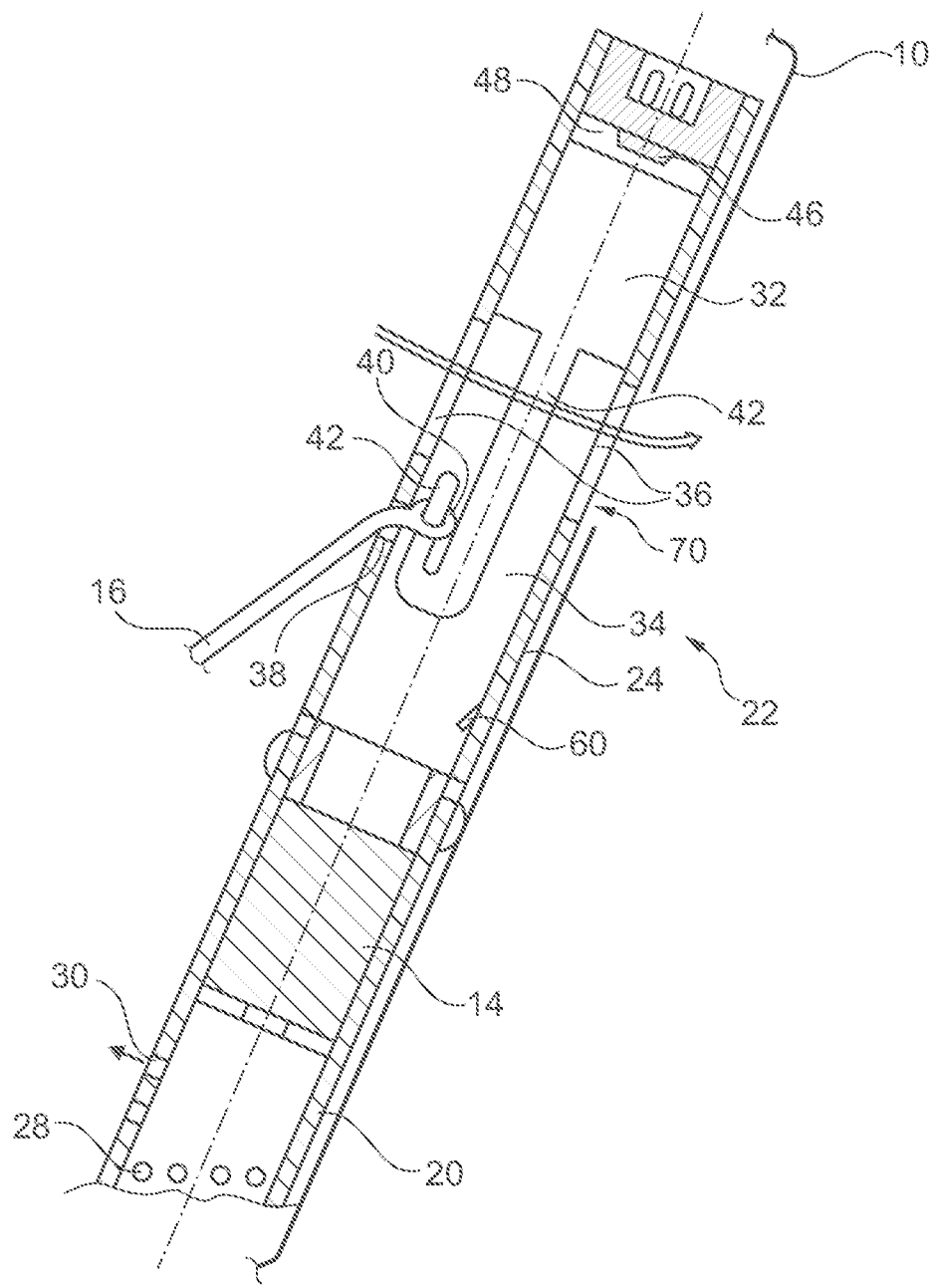
FIG. 5 shows a longitudinal section across another airbag unit according to the invention comprising another embodiment of the airbag control device according to the invention.

In the embodiment according to FIG. 5, inside the airbag control device no direct flow communication is present between the inflator 14 and the decoupling device 22. The entire airbag control device is accommodated inside the airbag 10. Gas generated by the inflator 14 flows through the outlet openings 30 into the interior of the airbag and ensures deployment thereof.

Part of the gas that ensures the deployment may flow out of the airbag 10, namely via the outlet openings 36, as long as the piston 32 has not been displaced. The outlet openings 36 are arranged opposed to each other, for example, and allow a flow through the decoupling device 22 just as in the case of an outlet valve (see arrows in FIG. 5). The airbag 10 includes an opening 70 which is aligned with an abutting outlet opening 36. The flow communication between the inflator 14 and the outlet openings of the decoupling device 22 of the airbag control device is effectuated especially via the interior of the airbag.

If, however, the decoupling device 22 is activated and the piston 32 moves over the outlet openings 36, a flow through the decoupling device 22 and gas flowing out of the airbag 10 are inhibited.

Preferably, the release of the tether 16 so that the airbag can adopt a larger volume and a larger width B (see FIG. 4) as well as the closing of the outlet openings 36 by the piston 32 are carried out in the same way as in an airbag control device in accordance with FIGS. 2 and 3.

What is claimed is:

1. An airbag control device for controlling the volume of an airbag of a restraining means, comprising an inflator for inflating the airbag and an electrically controllable decoupling device for a tension means via which the geometry of the airbag can be varied, wherein the inflator and the decoupling device are fluid-communicated and the decoupling device includes at least one outlet opening the cross-section of which is variable via an electrically controllable actuator and through which gas can escape from the inflator to the atmosphere, wherein the decoupling device includes an outer housing that is mechanically coupled to an inflator housing or is formed in one part or integrally with the inflator housing.

2. The airbag control device according to claim 1, wherein the decoupling device includes a cylindrical outer housing and is fluid-coupled to the interior of the inflator via an open front end.

3. The airbag control device according to claim 1, wherein inside the airbag control device the inflator is separated in terms of flow from the at least one outlet opening, and in that the at least one or more outlet openings are disposed in such a way that they allow gas to flow through the airbag control device for flowing out of the interior of the airbag to the atmosphere.

4. The airbag control device according to claim 1, wherein the actuator is configured so that it can both decouple the tension means and close the outlet opening.

5. The airbag control device according to claim 1, wherein the decoupling device includes a piston which is movable via the actuator and is adapted to decouple the tension means and/or to close the outlet opening.

6. The airbag control device according to claim 5, wherein the inflator is fluid-communicated with a piston chamber that includes, when the actuator is not activated, the at least one outlet opening which is open when the actuator is not activated.

7. The airbag control device according to claim 6, wherein the at least one outlet opening is provided in a cylinder wall guiding the piston.

8. The airbag control device according to claim 6, wherein the actuator acts on a side of the piston opposed to the piston chamber so as to move the piston into the piston chamber.

9. The airbag control device according to claim 5, wherein the outlet opening is disposed so that, by displacing the piston, the at least one outlet opening can be closed.

10. The airbag control device according to claim 5, wherein a device for retaining and/or releasing the tension means which is activated by displacing the piston is provided on the piston.

11. The airbag control device according to claim 10, wherein the device includes a hook fastened to the piston on which hook the tension means is detachably fastened, wherein the tension means protrudes through an opening in the outer housing into the interior of the decoupling device so as to be disposed there on the hook.

12. The airbag control device according to claim 1, wherein the actuator is a pyrotechnical actuator.

13. An airbag unit comprising an airbag having a panel on which at least one tension means is fastened, and comprising an airbag control device according to claim 1, wherein, in the non-activated state of the airbag, the tension means is fastened on the airbag control device and is detached from the airbag control device, when the decoupling device is activated.

14. The airbag unit according to claim 13, wherein the airbag control device is arranged inside the airbag and the at least one or more outlet openings are arranged so that they allow gas to flow through the airbag control device for flowing out of the interior of the airbag to the atmosphere.

15. The airbag unit according to claim 13, wherein the airbag is configured as a side airbag unit to be mounted on a vehicle seat frame of a vehicle seat.

\* \* \* \* \*